United States Patent [19]

Lang

[11] 4,015,155
[45] Mar. 29, 1977

[54] COVER AND BASE ARRANGEMENT FOR AN ELECTRICAL MACHINE

[75] Inventor: Karl Lang, Berlin, Germany
[73] Assignee: Siemens Aktiengesellschaft, Munich, Germany
[22] Filed: May 19, 1975
[21] Appl. No.: 578,803
[30] Foreign Application Priority Data
 June 6, 1974 Germany ............... 2427427
[52] U.S. Cl. ............... 310/89; 310/51; 310/64
[51] Int. Cl.² ............... H02K 5/00
[58] Field of Search ............... 310/51, 56, 52, 58, 310/85, 42, 89, 91, 88, 254, 273; 248/19, 23; 206/319; 220/4, 4 F; 174/52

[56] References Cited
UNITED STATES PATENTS

| | | | |
|---|---|---|---|
| 2,274,351 | 2/1942 | Wood | 310/254 |
| 2,777,079 | 1/1957 | Egglestone | 310/56 |
| 3,064,152 | 11/1962 | DePaul | 310/254 |
| 3,284,151 | 11/1966 | Morrison | 220/4 |
| 3,361,914 | 1/1968 | Janssen | 310/51 |
| 3,501,660 | 3/1970 | Wightman | 310/91 |
| 3,544,820 | 12/1970 | Wightman | 310/89 |
| 3,746,894 | 7/1973 | Dochterman | 310/51 |

Primary Examiner—R. Skudy
Attorney, Agent, or Firm—Kenyon & Kenyon Reilly Carr & Chapin

[57] ABSTRACT

The invention is directed to a base and cover arrangement for an electric machine. The cover is insulated against structure-borne sound and the machine with its base and cover arrangement is configured of elements which can be assembled by the building block principle. The stator of the machine includes pressure plates, tightening devices and the lamination stack. The base and cover arrangement includes a base structure and a cover including side members and a central upper cap. This central upper cap covers a cut-out which is provided in the end-face walls of the side members and which encompasses the shaft of the machine, permitting the stator and the rotor to be lifted out upwardly. The rotor rests in pedestal-type bearings which are also mounted on the base structure. The cover side members as well as the central upper cap are made in different configurations so as to be suited for different types of protection.

10 Claims, 5 Drawing Figures

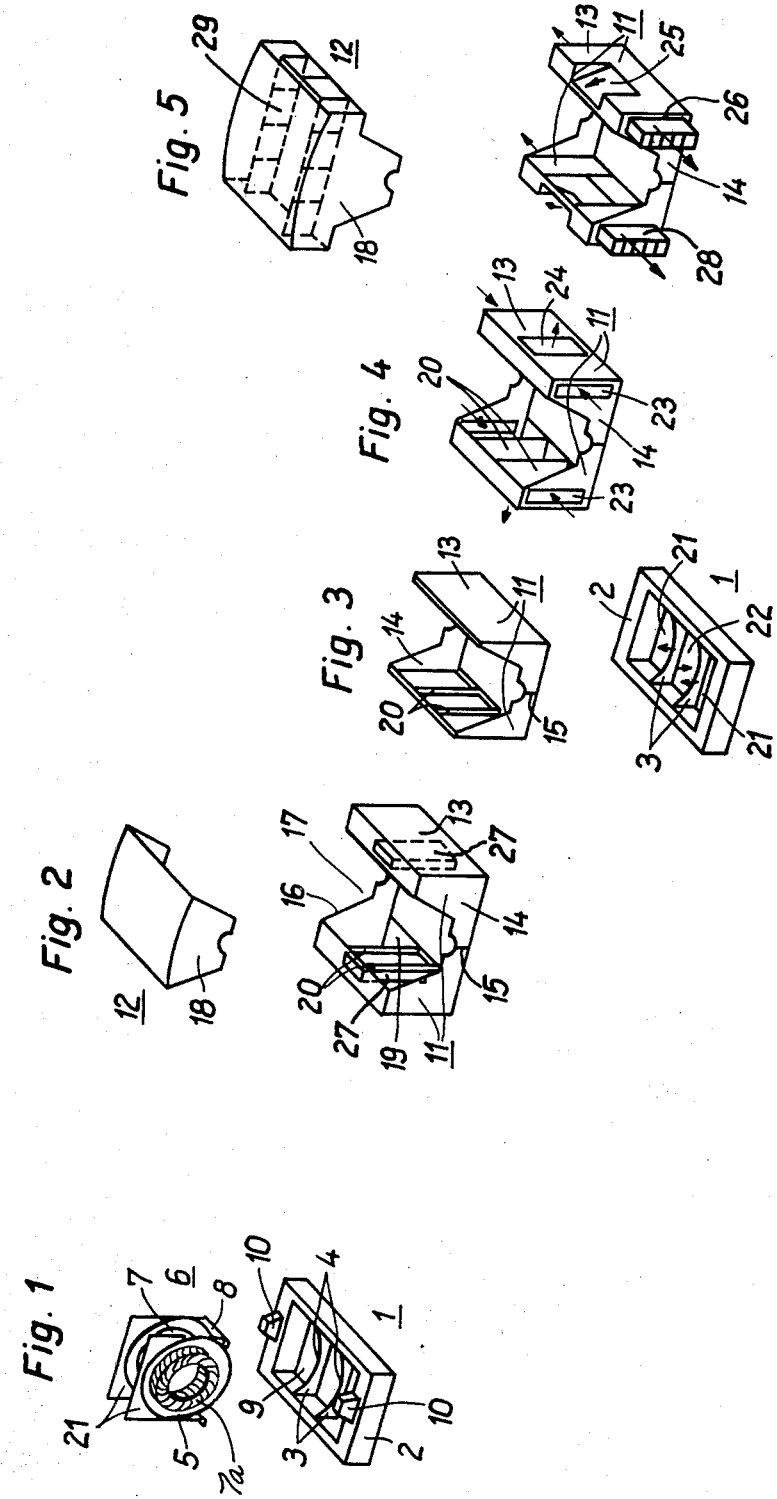

COVER AND BASE ARRANGEMENT FOR AN ELECTRICAL MACHINE

BACKGROUND OF THE INVENTION

The invention relates to a base and cover arrangement for an electric machine with a cover covering the stator. The stator includes a lamination stack carrying the winding and held together by shield-like pressure plates projecting beyond the lamination stack and tightening devices. The arrangement can be configured in accordance with the desired type of protection. In addition, the stator of this machine is mounted on a base structure which also supports the bearings. Such an electric machine is described in the Deutsche Auslegeschrift 1,121,199. The base of this known machine consists of a plate and four corner post and it supports fastening means for supporting the stator which is configured as a separate component. Also mounted on the base are lateral covers extending to the machine center, the bearings, and a cap located above the machine center. The lateral covers and the cap can be removed without thereby impairing the alignment of the stator. Therefore, the stator is readily accessible from all sides for inspection and servicing.

Because of the fact that the covers and cap of the known machine are physically separated from the stator, the cap in particular can be modified to suit the type of protection required. This allows an easy adaptation to the desired cooling system possible. However, no steps are taken to avoid transmission of structure-borne sound so that the covers as well as the cap, which are interconnected by the base, are sound-emitting surfaces. The known machine merely has provisions for the arrangement of noise suppressors inside the cover in front of the air intake and/or outlet openings.

It is an object of the invention to provide a base and cover arrangement for an electric machine with which its stator is readily accessible for servicing but at the same time, the machine will operate with a very low noise level.

SUMMARY OF THE INVENTION

The above object is achieved with the base and cover arrangement according to the invention which includes as a feature a base structure including a frame constructed of a hollow section and enclosing transverse walls running perpendicular to the direction of the axis. The edges of the transverse walls correspond to the shape of the pressure plates and the cover includes two cover side members mounted on the base frame so as to be insulated against structure-borne sound. The cover further includes a central upper cap. The two cover side members are configured in such a manner that the mid-portion of the cover side members forms the side walls of the machine and contains the cable terminals and supply lines for the machine.

Each of the side members has end-portions at respective sides of the mid-portion thereof and the end-portions of one of the side members is juxtaposed to corresponding ones of the end-portions of the other one of the side members to define respective end-face walls of the machine. Each two juxtaposed end-portions conjointly define a vertical interface in line with the center line of the rotor shaft and have a composite contour defining an upwardly opening cut-out encompassing the shaft whereby the stator and rotor may be lifted upwardly together. The central upper cap having end-face extensions covering corresponding ones of the upwardly opening cut-outs.

The electric machine equipped with a base and cover arrangement according to the invention includes such elements as the base structure, stator, side members and upper cap and can be assembled in the most simple manner and permit modifications of individual components to suit the type of protection desired. The stator is readily accessible and can be lifted out upwardly without removal of the cable connections and supply lines attached to the cover side members. In addition, the cover side members and the central upper cap supported thereby are mounted on the base structure so as to be insulated against structure-borne sound so that their surfaces, which account for the major portion of the total machine surface, namely approximately nine tenths, radiate no sound. But because of its rigid construction in the form of a frame built of a hollow section and its greater mass, the base frame, not insulated against structure-borne sound, deadens sound more effectively than the cover so that, overall, the noise level of the machine does not become noticeably worse due to the relatively small sound-emitting surface of the base frame.

It is of further advantage to provide sealing means in the form of elastic gaskets between the central upper cap and the cover side members, the elastic gaskets having a noise attenuation corresponding to the thickness of the cover. Because of the nature of their material, elastic gaskets have considerably less mass than the material used for the construction of the cover so that, if the gaskets were constructed solely for sealing purposes, the sealed interface would have less sound attenuation than the normal cover surface. According to another feature of the invention, when the thickness of the gasket is made in consideration of the sound reduction in mind, this disadvantage is avoided, and the cover, therefore, behaves with respect to noise as a single-piece component.

Although the invention is illustrated and described herein as a cover and base arrangement for an electrical machine, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIG. 1 is a perspective schematic diagram showing the removed stator assembly of an electric machine as well as the base structure of the base and cover arrangement according to the invention.

FIG. 2 is also a perspective schematic diagram showing the parts of the cover of the base and cover arrangement according to the invention for closed cooling circuit with heat exchangers. The view shows the two side members as well as the central upper cap.

FIG. 3 illustrates the side members of the cover and the base structure in a configuration for a machine having a closed cooling circuit and wherein the cooling air is directed to the machine through the foundation.

FIG. 4 shows the side members of the cover according to another embodiment of the invention wherein an open machine is accommodated.

FIG. 5 illustrates the side members as well as the central upper cap for a weather protected machine.

DESCRIPTION OF THE PREFERRED EMBODIMENTS OF THE INVENTION

The base structure 1 of the electric machine includes a frame 2 constructed of a hollow section and enclosing transverse walls 3 extending perpendicular to the shaft direction. The edges 4 of the transverse walls 3 fit the shape of the pressure plates 5 of the stator 6. The stator includes a lamination stack 7 which is held together by the pressure plates 5 and tightening devices, if required, and which carries a winding 7a. Attached between the two pressure plates 5 are feet 8 by which the stator 6 is mounted on the surface of the frame 2 of the base structure 1. Then, the edges of the pressure plates 5 underneath the feet rest against the edges 4 of the transverse walls 3 making a tight seal therewith. Furthermore, underneath the transverse walls 3 is located the bottom 9 which closes off the interior of the frame 2. This forms various chambers in the area of the base structure 1 for accommodating the coil ends on the one hand and the stator lamination stack 7 on the other. These chambers are flooded by the cooling air in various ways depending on the type of protection selected for the machine.

In addition, mounted on the surface of the frame 2 of the base structure 1 are bearing pedestals 10 to support the rotor (not shown).

The outer cover of the machine is provided by the cover side members 11 and the central upper cap 12. The mid-portion 13 of the cover side members 11 forms the side walls of the machine and accommodates the cable connectors in the form of a terminal box and supply lines (not shown). The embodiment of FIG. 2 can also accommodate heat exchangers 27. The wall end-portions 14 of the cover side elements 11 form end-face walls and each extends to the vertical parting line 15 going through the shaft center-line. Their edges 16 define a cut-out 17 which also encompasses the shaft and permits the stator and the rotor to be lifted out upwardly. Cut-outs 17 are covered up by appropriate extensions 18 on the face ends of the central upper cap 12 when the stator and rotor are installed.

The width of the central parts 13 of the cover side members 11 corresponds approximately to the distance between the two bearing pedestals 10 mounted on the frame 2 of the base structure 1. End-portions in the form of walls 14 on the face ends of the cover side members 11, therefore, are adjacent to the end face of a corresponding bearing pedestal 10 facing the stator 6 of the machine. Therefore, it is a simple manner to mount them also on the frame 2 of the base structure, and the vertical interface 15 is covered up by the corresponding bearing pedestals 10. It may additionally be bridged by a metal plate fastened to the face walls 14 so that no gap remains at this point. Since the lateral overhang of the cover side members 11 depends on the type of protection selected they may project more or less beyond the base structure 1 in the direction perpendicular to the shaft direction, the lateral bottom parts 19 in the cover side members 11 preventing the formation of an opening.

The central parts 13 of the cover side members 11 each contain further two transverse walls 20 whose mutual spacing corresponds to that of the pressure plates 5. The part of each pressure plate 5 located above the feet 8 is each provided with an extension 21 so that a rectangular shape is obtained. The edges of these extensions 21 make sealing contact with the transverse walls 20 so that the space in the area above the feet 8 is divided in the same manner for the conduction of the cooling air as below the feet. The rectangular shape of the extensions 21 simplifies establishing the seal against the transverse walls 20 as well as against the upper cap 12.

FIG. 3 shows the base structure 1 and the cover side members 11 constructed for an enclosed electric machine to which the cooling air is supplied through the foundation (not shown). In this case, openings for the entry of cooling air are provided in the base structure 1 inside the frame 2 between the transverse walls 3. The cooling air enters through the two lateral openings 21 and is discharged through the central opening 22 after flowing through the machine.

FIG. 4 shows an embodiment of the invention wherein the cover side members 11 are provided for an open machine. Here, air intake openings 23 are provided in each of the end-face walls 14, and the air discharge opening 24 in the central part 13 in the area between the transverse walls 20. Because of the fact that noise emission together with the cooling air cannot be avoided in such an open machine, especially at the air discharge opening, it is recommended to provide noise absorbers 28 in front of the openings 24 and possibly also in front of the openings 23 capable of keeping the noise level low also in a machine of open construction.

Finally, FIG. 5 shows the embodiment of the cover side members 11 and of the central upper cap 12 for a weatherproof machine. Here, the cooling air enters the central cap 12, in whose interior filters 29 are disposed, through air intake openings, not visible, but provided on the underside of the central cap 12 above the indentation 25 in the center parts 13 of the cover side elements 11. The cooling air then flows through the interior of the machine and is discharged through the air discharge openings 26 in the end-face walls 14.

In all embodiments of the base and cover arrangement according to the invention, the cover side members are provided with insulation (not shown) against structure-borne sound on their underside wherewith they are mounted to the surface of the frame 2 of the base structure 1. This insulation consists of an elastic material, the dimensions of which are selected so that the pressure per unit of area exerted by the weight of the cover side members 11 including the parts contained in them and of the central upper cap 12 is in the range between 0.5 to 1 kg/cm$^2$. In addition, there is provided another elastic gasket at the interface between the edges 16 of the end-face walls 14 of the cover side members 11 and the edges of the central upper cap 12. The dimensions of the elastic gasket are selected so that the sound reduction in the interface corresponds to that of the cover wall thickness despite the lesser mass of the elastic material. What is achieved thereby is that the interface between the central upper cap 12 and the cover side members 11 has no disadvantageous effects with respect to sound suppression. Because of the fact that therewith the entire machine cover formed of the cover side members 11 and the central upper cap 12 is insulated against structure-borne sound, a lower noise level of the electric machine during its operation is achieved. Despite this fact, the specific construction of the cover makes possible easy accessibility to the stator of the electric machine, and the stator together with the rotor can also be lifted out upwardly without difficulty.

The elastic material utilized for sound suppression may be rubber as well known in the art.

What is claimed is:

1. In an electric machine equipped with cable terminals and served by supply lines having a stator 6 including a stator lamination stack 7, a winding 7a supported on said stack, shield-like pressure plates 5 overlapping the stack at respective ends of said stack, and means for holding the stack together; a rotor having a rotor shaft and bearings; and a base and cover arrangement for supporting and protecting said machine, the improvement comprising:

a base structure 1 for supporting said stator and said rotor bearings including a frame 2 made of a hollow section, transverse walls 3 enclosed in said frame, said walls extending perpendicular to the direction of the longitudinal axis of said rotor and having a profile corresponding to the shape of said pressure plates;

a cover including two side members 11 seated on said frame and a central upper cap 12, said side members each having a mid-portion 13 forming a side wall of said machine and configured to recieve said cable terminals and said supply lines, and end-portions 14 disposed at respective sides of said mid-portion in juxtaposed relationship to adjacent end-portions of said side members so as to form end-face walls of said machine, each two of said juxtaposed end-portions conjointly defining a vertical interface 15 in line with the center line of said rotor shaft and having a composite contour defining an upwardly opening cut-out 17 encompassing said shaft for lifting said stator and said rotor upwardly together, said upper cap having end-face extensions 18 covering corresponding ones of said cut-outs; and elastic sealing means, disposed at the interface of and between said central upper cap and said side members, and having a sound attenuation capability corresponding to the wall thickness of said cover.

2. The base and cover arrangement of claim 1, said base structure comprising bearing pedestals for supporting the rotor thereon; said bearing pedestals being placed on said frame and each of said bearing pedestals having an end-face facing the stator; and, said end-portions of said side members being disposed adjacent said end-face of a corresponding one of said bearing pedestals.

3. The base and cover arrangement of claim 1 wherein the stator is equipped with feet for supporting the same on said frame, and the pressure plates of the stator lying seal-tight against the edges of said transverse walls.

4. The base and cover arrangement of claim 3, said shield-like pressure plates having extensions at an elevation above said feet which impart to said pressure plates a rectangular shape.

5. The base and cover arrangement of claim 4, said mid-portion of each of said side members having transverse walls facing inwardly toward the machine, said last-mentioned walls being disposed so as to lie seal-tight against said pressure plates.

6. The base and cover arrangement of claim 5, said transverse walls of said mid-portions and said pressure plates conjointly defining enclosed spaces, each of said side members having air entry openings and air exit openings for directing air to said spaces.

7. The base and cover arrangement of claim 6, said openings being covered by noise attenuators.

8. The base and cover arrangement of claim 1, said frame having a base containing air openings disposed between said transverse walls enclosed by said frame.

9. The base and cover arrangement of claim 1 comprising heat exchangers disposed at the interior of said mid-portions of said side members.

10. The base and cover arrangement of claim 1 comprising filters arranged in said central upper cap.

* * * * *